United States Patent
Noussitou et al.

(10) Patent No.: US 6,729,138 B2
(45) Date of Patent: May 4, 2004

(54) DEVICE AND METHOD FOR ADJUSTING THE POWER OF A POWER PACK DRIVING A HELICOPTER ROTOR

(75) Inventors: Christian P. Noussitou, Cuqueron (FR); Jean-Philippe J. Marin, Pau (FR)

(73) Assignee: Turbomeca, Bordes (FR)

(*) Notice: Subject to any disclaimer, the term of this patent is extended or adjusted under 35 U.S.C. 154(b) by 0 days.

(21) Appl. No.: 10/149,964

(22) PCT Filed: Dec. 18, 2000

(86) PCT No.: PCT/FR00/03571
§ 371 (c)(1),
(2), (4) Date: Oct. 15, 2002

(87) PCT Pub. No.: WO01/48574
PCT Pub. Date: Jul. 5, 2001

(65) Prior Publication Data
US 2003/0059303 A1 Mar. 27, 2003

(30) Foreign Application Priority Data
Dec. 23, 1999 (FR) ............................................. 99 16392

(51) Int. Cl.$^7$ ................................................ F02C 9/28
(52) U.S. Cl. ...................................... 60/773; 60/39.281
(58) Field of Search ........................... 60/39.281, 773, 60/791

(56) References Cited

U.S. PATENT DOCUMENTS

| | | | |
|---|---|---|---|
| 4,423,593 A | | 1/1984 | Zagranski et al. |
| 4,466,526 A | | 8/1984 | Howlett et al. |
| 4,648,797 A | | 3/1987 | Martin |
| 5,029,441 A | * | 7/1991 | Parsons ................... 60/39.281 |
| 5,046,923 A | | 9/1991 | Parsons et al. |
| 5,088,278 A | * | 2/1992 | Smith et al. ............. 60/39.281 |
| 5,509,265 A | * | 4/1996 | Benkosky et al. ....... 60/39.281 |
| 5,775,089 A | | 7/1998 | Skarvan |
| 5,812,428 A | | 9/1998 | Zou et al. |

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A device for adjusting the power of a power pack driving a helicopter rotor, including a device for dosing the fuel feed rate. An electronic control device is further provided that acquires an input signal corresponding to the rotational speed of the rotor. A processor processes the input signal by using a differentiating element and a summing element. Further, a threshold comparator receives the output signal of the processor and an actuating device receives the output signal of the electronic control device and actuates the device for dosing the fuel feed rate.

14 Claims, 2 Drawing Sheets

Figure 1:
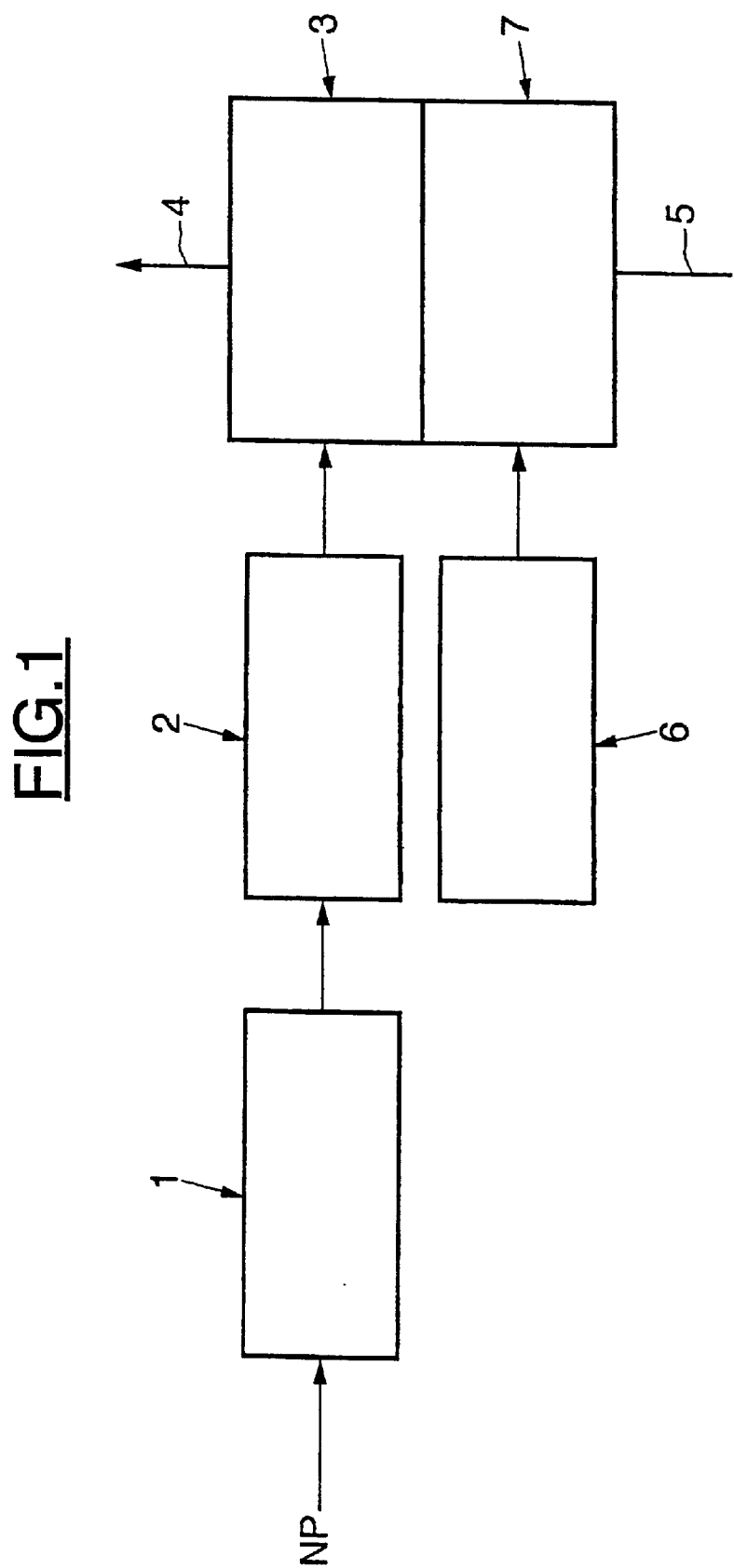

DEVICE AND METHOD FOR ADJUSTING THE POWER OF A POWER PACK DRIVING A HELICOPTER ROTOR

The subject of the present invention is a device for adjusting the power of a power pack driving a helicopter rotor, more especially allowing assistance with piloting in emergency backup mode in the event of a failure of the main system for adjusting the speed of rotation of the rotor of the helicopter.

The subject of the present invention is also an adjusting method used in the event of a failure of the main adjusting system.

Helicopter turboengines are equipped with an adjusting system which fulfills a plurality of more or less complex functions. The main function of the adjusting system is nevertheless to adjust, in flight, the power delivered by the turboengine so as to maintain the speed of rotation of the rotor of the helicopter at a substantially constant value.

The adjusting systems which are frequently encountered nowadays are electronic adjusting systems fitted with a manual emergency backup device.

During normal operation, adjustment is managed by an electronic computer which receives signals originating from various sensors and controls various actuators so as to automatically adjust the power delivered by the engine. In the event of a failure affecting the electronic adjusting system and causing the computer to be incapable of adjusting the power delivered by the engine, the pilot of the helicopter must, by means of a manual emergency backup device, manually alter the power delivered by the turboengine as a function of the requirements engendered by the maneuvers of the helicopter (setting of pitch, lowering of pitch, landing, etc.). The piloting burden is substantially increased thereby. Specifically, the pilot must at each instant manually adjust the feed rate of the fuel supplying the turboengine. This is especially constraining on a single-engine helicopter, any maneuver of the helicopter requiring a specific manual alteration of the feed rate of the fuel.

It is therefore necessary for the pilot to be correctly trained for this particular situation. However, in order to decrease the risks which may result from inadequate training of the pilot, the manufacturer of the turboengine is apt to guarantee an extremely low failure rate for the main adjusting system, thereby entailing greater complexity and hence an augmentation in the cost of the adjusting system as a whole.

The subject of the present invention is a simple, inexpensive device making it possible to improve the adjusting of the power of the power pack in the event of a failure of the main adjusting system and to ease piloting in emergency backup mode.

The subject of the present invention is also an adjusting device which increases safety in the event of a failure and is relatively cheap to make.

The device for adjusting the power of a power pack driving a helicopter rotor according to the invention comprises a means of dosing the fuel feed rate, an electronic control device comprising a means of acquisition of an input signal corresponding to the speed of rotation of the rotor (NP), a means of processing said input signal comprising a differentiator element and a summator element, as well as a threshold-based comparator receiving the output signal from said processing means. An actuator device receives the output signal from the electronic control device and progressively actuates the means of dosing the fuel feed rate in the direction of an increase in feed rate, of a decrease in feed rate or of an unchanged maintenance of the feed rate.

Such a device is especially simple, easy to install and to use, owing to the fact that it does not use any manual control, thereby eliminating any lever, linkage, bell crank, etc. In the event of a failure of the main adjusting system, the pilot of the helicopter is no longer obliged to regulate the fuel feed rate manually, it being controlled automatically.

The piloting of the helicopter, in the event of a failure of the main adjusting system, is greatly eased with respect to emergency backup piloting with manual alteration of the power. This because the pilot simply has to adopt gentle piloting, without any abrupt maneuver and to take care to comply with the maximum ratings of the engine as well as the limits on the torque and on the speed of the rotor of the helicopter. The pilot need no longer worry about the fuel feed rate which is overseen automatically by the device of the invention. In particular, the pilot need no longer at each instant manually alter the fuel feed rate in order it to adapt it to the power requirements engendered by the maneuvers of the helicopter such as, for example, settings of pitch, lowerings of pitch, landing, etc.

In an advantageous embodiment, the actuator device is an electric device and the electronic control device furthermore includes a means of electrical supply of the actuator device.

A low-pass filter can be provided in order to perform a filtering of the input signal.

The comparator preferably comprises a predetermined high threshold and a predetermined low threshold.

The actuator device is preferably designed so as to act at relatively low speed and advantageously comprises a minimum position stop. In this way, a signal integration effect is automatically obtained. Moreover, the limitation of the speed of variation of the fuel feed rate which results therefrom makes it possible to accelerate the engine without any risk of pumping. Likewise, the minimum position stop makes it possible to decelerate the engine without any risk of shutdown.

The actuator device can for example be a DC motor whose speed of rotation is constant for a specified supply voltage, or else a stepper motor.

The means of dosing the fuel feed rate can comprise an auxiliary doser of fuel cooperating with a main doser, auxiliary doser acting in parallel with the main doser so as to add some feed rate to the feed rate existing at the moment of the failure and acting in series with the main doser so as to remove some feed rate. As a variant, the dosing means may be a single dosing member controlled by a stepper motor with dual input, the one actuated by the main adjusting system and the other actuated by the device of the invention, in the event of a failure of the main adjusting system.

The invention is especially adapted to the case where the power pack is a turboengine.

The invention also relates, in a more general manner, to a method for adjusting the power of a power pack driving a helicopter rotor in the event of a failure of the main adjusting system, in which the increasing or the decreasing of the fuel feed rate to the power pack is controlled automatically with respect to the feed rate at the moment of the failure, as a function of the speed of rotation of the rotor (NP).

The use as single input signal of the speed of rotation of the rotor allows the implementation of the method of the invention by especially simple and inexpensive means.

Figure 2:
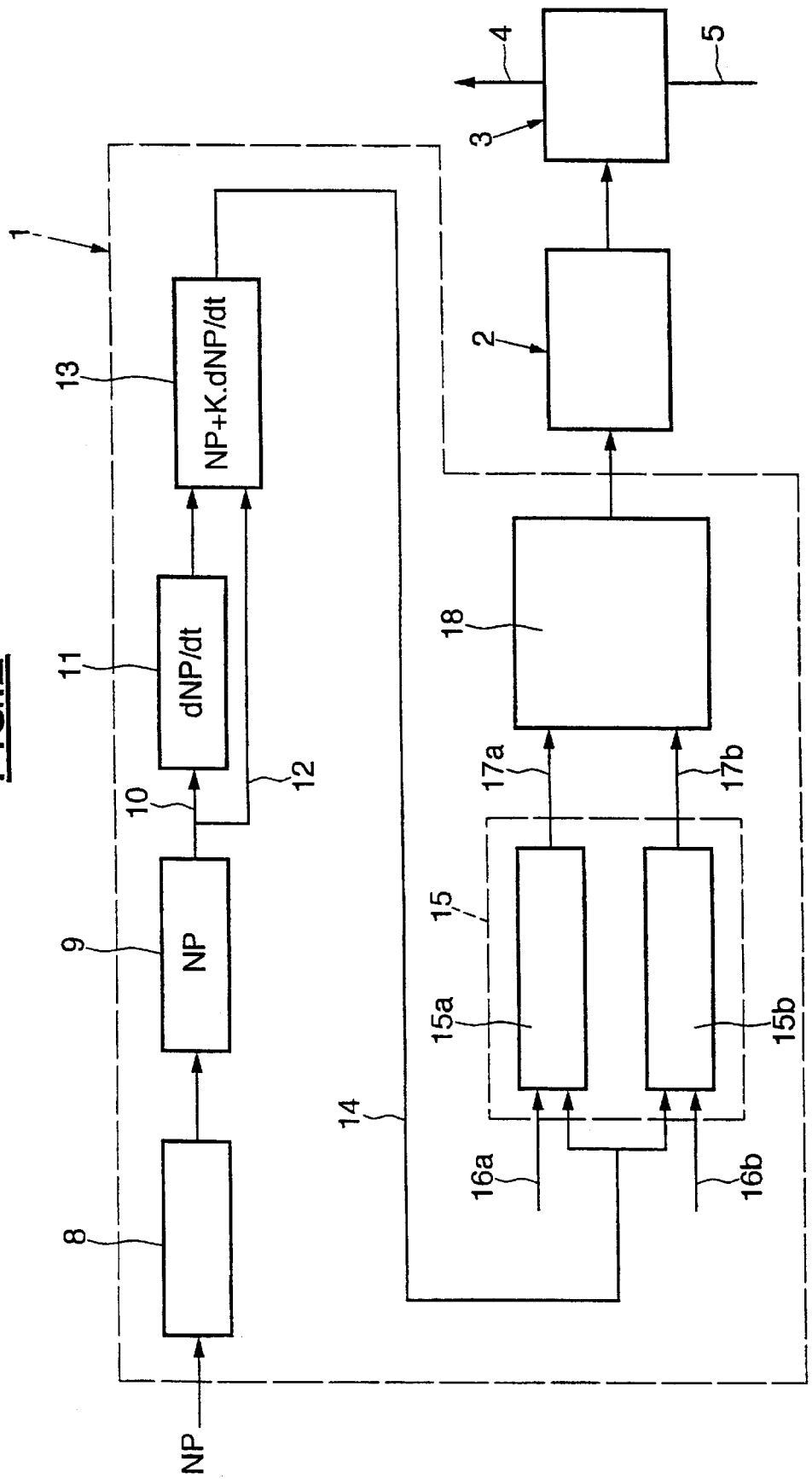

The invention will be better understood on studying a particular embodiment taken by way of example and illustrated by the appended drawings, in which:

FIG. 1 is a functional diagram illustrating the general principle of a device according to the invention; and FIG. 2 is a functional diagram showing an exemplary embodiment of a device according to the invention.

A device for adjusting the power of a power pack driving a helicopter rotor according to the present invention, such as is illustrated in FIG. 1, comprises an electronic control device 1 receiving an input signal NP corresponding to the speed of rotation of the rotor. The electronic control device is linked to an actuator device 2 which receives the output signal from the electronic control device 1 and which progressively actuates a means 3 of dosing the fuel feed rate, this fuel being thereafter delivered to the power pack driving the rotor by the ducting shown diagrammatically at 4, the fuel being supplied from a tank (not illustrated), via ducting shown diagrammatically by the reference 5. The actuator 2 makes it possible to obtain, via the dosing means 3, a progressive increase or a progressive decrease of the fuel feed rate, according to the signal received from the electronic control device 1.

The electronic control device 1 and the actuator device 2 associated with the dosing means 3, constitute the entire emergency backup device capable, according to the invention, of controlling the fuel feed rate to the power pack, for example a turboengine, in such a way as to add or remove fuel feed rate with respect to the fuel feed rate preexisting at the moment at which a failure occurs.

FIG. 1 likewise diagrammatically represents the main adjusting system supplying the turboengine with fuel during nominal operation, that is to say in the absence of a failure. In this case, the main adjusting system 6 acts on a main dosing means 7 to provide the turboengine, via the ducting 4, with a fuel feed rate adapted at each instant to the helicopter's flight conditions.

As is known, the main adjusting system makes it possible, in flight, to adjust the power delivered by the engine so as to maintain the speed of rotation of the rotor of the helicopter at a substantially constant value. The power adjusting device of the invention makes it possible to compensate for the ineffectiveness of the main adjusting system 6 in the event of a failure of the latter, without the pilot being obliged to undertake an especially tricky manual alteration.

In the embodiment illustrated in FIG. 1, the fuel dosing means 3 is distinct from the main dosing means 7. The dosing means 3 acts in parallel with the main dosing means 7 so as to add fuel feed rate and in series with respect to the main dosing means 7 so as to decrease the feed rate with respect to the fuel feed rate existing at the moment of the failure.

In the embodiment illustrated in FIG. 2, once again we have the electronic control device 1 receiving as single input signal a signal NP corresponding to the speed of rotation of the rotor. The electronic device 1 comprises a means of acquisition 8 of the signal NP followed by a filtering device 9, for example in the form of a low-pass filter. The output signal from the filter 9 is dispatched via the connection 10 to a differentiator element 11 and via the connection 12 to a summator device 13. The output signal from the summator 13 is therefore of the form $NP+K.dNP/dt$. This signal is transmitted by the connection 14 to a threshold-based comparator 15 comprising a comparator element with high threshold 15a and a comparator element with low threshold 15b. The respective values of high threshold and of low threshold are conveyed to the comparators 15a and 15b via the connections 16a, 16b.

The threshold-based comparator 15 therefore compares the signal $NP+K.dNP/dt$ with a high threshold and with a low threshold. The comparator 15 emits an output signal on one of its outputs 17a, 17b which is linked to a device 18 for electrical supply controlling the actuator device 2. The control of the actuator 2 is therefore effected in all-or-nothing mode in the direction of an increase in the fuel feed rate if $NP+K.dNP/dt$ is below the low threshold or in the direction of a decrease in fuel feed rate if $NP+K.dNP/dt$ is above the high threshold. In the absence of any signal emitted by the comparator 15, that is to say when the signal $NP+K.dNP/dt$ lies between the high and low thresholds, the actuator 2 does not act and the fuel feed rate remains unchanged.

Thus, the device of the invention acts so as to maintain the value of the signal NP between the predetermined low threshold and the predetermined high threshold, this amounting to maintaining the speed of rotation of the rotor of the helicopter between two likewise predetermined thresholds.

The derivative term "$K.dNP/dt$" makes it possible to anticipate the control of the actuator device 2 as soon as a variation in the power requirement causes a variation of the speed of rotation of the rotor of the helicopter and hence of the signal NP.

The electric actuator device 2 preferably moves at relatively low speed. Moreover, it advantageously comprises a minimum position stop. In this way, as previously indicated, a limitation of the speed of variation of the feed rate of the fuel and a limitation of the fuel feed rate at low value are obtained, thus allowing acceleration of the turboengine without any risk of pumping and deceleration without any risk of shutdown.

The electric actuator device 2 can be a DC motor or a stepper motor, ensuring a relatively slow speed of movement.

The device 18 for electrical supply of the actuator device 2 can, either control a constant speed of movement, or control a speed of movement dependent on the signal NP and on the direction of movement.

The electronic control device 1 as a whole can be made in several ways. Thus, it is possible to use operational amplifiers making it possible to make an analog electronic device. It is also possible to use programmable digital components of the EPLD type, specifically developed components of the ASIC type or even to use a microprocessor controlled by software making it possible to obtain the functions which have just been described.

The electronic control device 1 can be integrated into a specific box corresponding to the emergency backup operation of adjustment or on the contrary be integrated into a box which also carries out other functions of the helicopter.

The adjusting device of the invention makes it possible, with a low production overhead cost, to offer an emergency backup mode of operation in the event of a failure of the main adjusting system, the use of which by the pilot is much easier and safer than that of a purely manual emergency backup device.

In the event of a failure of the main adjusting system, the device of the invention automatically orders an increase or a decrease of the fuel feed rate to the power pack with respect to the feed rate existing at the moment of the failure, doing so as a function solely of the speed of rotation of the rotor of the helicopter. The piloting burden which results therefrom is much less than that resulting from the use of a manual emergency backup device, of conventional type. Specifically, by virtue of the adjusting device of the invention, the pilot simply has to adopt gentle piloting and to take care to comply with the operating limits pertaining both to the engine and to the flight of the helicopter. The feed rate of the fuel is overseen automatically by the adjusting device of the invention.

This simplification is especially worthwhile on a single-engine helicopter, in which any maneuver of the helicopter requires manual alteration of the fuel feed rate.

The device of the invention therefore increases safety, since it requires less dexterity on the part of the pilot. Furthermore, by virtue of the device of the invention, it is no longer necessary to undertake specific training of the pilot for piloting in emergency backup mode, thereby exhibiting a considerable economic benefit for the operator.

The device of the invention may also make it possible to reduce the constraints on reliability, safety and availability of the main adjusting system. Specifically, by having available a reliable and easily commandable emergency backup mode of operation in the event of a failure, it is possible to accept an increase in the acceptable rate of failures of the main adjusting system.

The device of the invention is especially adapted to the turboengines mounted on single-engine helicopters, on account of the magnitude of the gain in terms of ease of use for the pilot with respect to a purely manual emergency backup device. Moreover, in this case the device of the invention allows a decrease in production costs, the manual emergency backup devices requiring a high-cost rotating-handle control device which is complex to manufacture.

The device of the invention can also be used on twin-engine helicopters. In this case, it may be necessary, in order to avoid overly large imbalances of load between the two engines, to make provision for automatic adaptation of the adjustment laws for the engine remaining in normal operation when the other engine switches to emergency backup mode of operation.

The device of the invention is especially simple to make on account of the fact that a single parameter is used as input, namely the speed of rotation of the rotor, that the necessary calculation function is simple (comparison of the sum of the speed signal and of its derivative with two predefined thresholds) and that an electric actuator is used to control in all-or-nothing mode an increase in fuel feed rate, a decrease in feed rate or an unchanged maintenance of the fuel feed rate.

What is claimed is:

1. A device for adjusting power of a power pack driving a helicopter rotor, comprising:

means for dosing a fuel feed rate;

an electronic control device comprising means for acquiring an input signal corresponding to a speed of rotation of the rotor;

means for processing said input signal comprising a differentiator element and a summator element, wherein the summator element is configured to sum the speed of rotation input signal and its derivative and, wherein a threshold-based comparator is configured to receive an output signal from said summator element and to emit an output signal to an actuator device configured to act progressively on the means for dosing the fuel feed rate in a direction of an increase or of a decrease in feed rate.

2. The adjusting device as claimed in claim 1, wherein the actuator device includes an electric device and the electronic control device further includes means for electrical supply of the actuator device.

3. The adjusting device as claimed in claim 1, further comprising a low-pass filter configured to perform a filtering of the input signal.

4. The adjusting device as claimed in claim 1, wherein the comparator comprises a high threshold and a low threshold.

5. The adjusting device as claimed in claim 1, wherein the actuator device acts at a relatively low speed and comprises a minimum position stop.

6. The adjusting device as claimed in claim 5, wherein the actuator device includes a DC motor with a constant speed of rotation for a specified supply voltage.

7. The adjusting device as claimed in claim 5, wherein the actuator device includes a stepper motor.

8. The adjusting device as claimed in claim 1, wherein the means for dosing the fuel feed rate comprises an auxiliary doser of fuel acting in parallel with a main doser of fuel.

9. The adjusting device as claimed in claim 1, wherein the power pack is a turboengine.

10. A method for adjusting power of a power pack driving a helicopter rotor in an event of a failure of a main adjusting system, comprising:

at the moment of said failure of the main adjusting system, measuring and maintaining a fuel feed rate to the power pack;

measuring a speed of rotation of the rotor; and after said failure of the main adjusting system, adjusting said fuel feed rate as a function of said measured speed of rotation.

11. A helicopter comprising:

a power pack driving a helicopter rotor; and a main adjusting system configured to supply the power pack by means for dosing a fuel feed rate;

an emergency device for backup in an event of a failure of the main adjusting system, the emergency device comprising:

an electronic control device comprising means for acquiring an input signal corresponding to a speed of rotation of the rotor, means for processing said input signal comprising a differentiator element and a summator element configured to sum the speed of rotation input signal and its derivative; and a threshold-based comparator configured to receive an output signal from said summator element and to emit an output signal to an actuator device configured to act on the means for dosing the fuel feed rate in a direction of an increase, a decrease, or a maintenance of the fuel feed rate.

12. The method as claimed in claim 11, wherein the fuel feed rate is automatically maintained and adjusted.

13. The method as claimed in claim 12, wherein the fuel feed rate is modified solely as a function of said measured speed of rotation.

14. The method as claimed in claim 13, wherein the fuel feed rate is an instantaneous fuel feed rate.

* * * * *